United States Patent
Hussain et al.

[11] 3,908,017
[45] Sept. 23, 1975

[54] SYMPATHOMIMETIC COMPOSITIONS CONTAINING AN ESTER OF -3-HYDROXY-α-[(METHYLAMINO)METHYL[BENZYL ALCOHOL AND METHODS OF USE

[75] Inventors: Anwar A. Hussain; James E. Truelove, both of Lawrence, Kans.

[73] Assignee: INTERx Research Corporation, Lawrence, Kans.

[22] Filed: May 9, 1974

[21] Appl. No.: 468,477

Related U.S. Application Data

[62] Division of Ser. No. 354,540, April 26, 1973, Pat. No. 3,825,583.

[52] U.S. Cl. ............................................ 424/311
[51] Int. Cl.² ........................................ A61K 31/22
[58] Field of Search ................................. 424/311

[56] References Cited
UNITED STATES PATENTS

| | | | |
|---|---|---|---|
| 3,180,887 | 4/1965 | Zolss et al. | 260/479 |
| 3,463,808 | 8/1969 | Bond et al. | 260/479 |
| 3,657,244 | 4/1972 | Mentrup | 260/256 |

OTHER PUBLICATIONS
New Drugs (1966), pp. 327–331.

*Primary Examiner*—Norman A. Drezin
*Attorney, Agent, or Firm*—Charles N. Blitzer

[57] ABSTRACT

A novel ester of the formula:

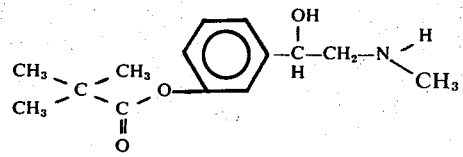

and the non-toxic pharmaceutically acceptable acid addition salts thereof. The compound evidences increased stability and lipoidal solubility and is extremely valuable in the treatment of conditions responsive to sympathomimetic agents and especially in the management of asthma, nasal congestion, and, as a decongestant, vasoconstrictor, mydriatic agent and anti-glaucomatous agent in the practice of opthalmology.

13 Claims, No Drawings

SYMPATHOMIMETIC COMPOSITIONS CONTAINING AN ESTER OF -3-HYDROXY-α-[(METHYLAMINO)METHYL] BENZYL ALCOHOL AND METHODS OF USE

CROSS-REFERENCE TO RELATED APPLICATIONS

This application is a divisional application of our earlier co-pending application Ser. No. 354,540, filed on Apr. 26, 1973, now U.S. Pat. No. 3,825,583.

BACKGROUND OF THE INVENTION

The present invention relates to both a novel and useful therapeutic ester of 3-hydroxy-α-[(methylamino)-methyl]benzyl alcohol, commonly known as phenylephrine, and to pharmaceutical compositions containing same. More particularly, the invention pertains to a new compound represented by Formula I:

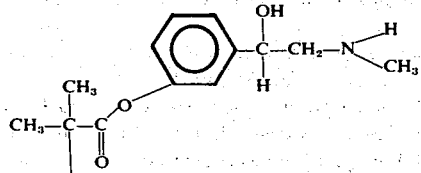

(Formula 1)

and its pharmaceutically acceptable, non-toxic acid addition salts. The compound and its salts are useful as decongestants and ophthalmological agents and can be administered per se or in the form of a composition comprised of the compound of the invention and a pharmaceutically acceptable carrier therefor.

Phenylephrine is a well-known sympathomimetic amine whose principal field of use is as a nasal decongestant and as a mydriatic. However, a number of inherent disadvantages are associated with this prior art compound which have substantially precluded its more widespread acceptance.

One of these disadvantages is its instability to both air and light, as well as to chemical attack by many agents that are conventionally used in pharmaceutical preparations. Past attempts by the prior art to overcome the problem of instability have not met with any acceptable success. One such attempt involved acidifying solutions containing the drug which solutions were then irritating to body tissue, and if these solutions were later adjusted to a physiological pH, the free drug frequently precipitated resulting in the deterioration of the product. It has also been suggested to protect the drug against oxidative deterioration by the addition of the anti-oxidant sodium bisulfite to a solution containing drug. It was found, however, that this antioxidant chemically attacked the aliphatic side chain of the drug to form a biologically inactive derivative thereof. Moreover, the prior art 3-hydroxy-α-[(methylamino)methyl]benzyl alcohol suffered from the disadvantage of negligible lipoid solubility, attributed to its hydrophilic phenolic hydroxyl group, which tended to restrict the medical application of the drug. For example, high concentrations (up to 10 percent) of the prior art compound are being used as mydriatic agents. However, these solutions are found to be very irritating to the eye.

Furthermore, the prior art compound is currently administered orally at a dose of about 10 mgm. However, even when given at a dose of 250 mgm orally, the biological response is unreliable (L. S. Goodman and Alfred Gilman, *Pharmacological Basis of Therapeutics*, Macmillan Co., London, 1970. ]4th Ed.] p. 510). This erratic biological response has been found to be the result of metabolic conjugation of the phenolic hydroxy group. Therefore, there exists an immediate need for a new and useful pharmaceutical compound that possesses therapeutic properties useful in treating bronchial asthma, nasal congestion, and the like, and ophthalmic uses such as for conjuctival congestion, temporary vasoconstriction, mydriasis, and glaucoma treatment while remaining essentially free from the unwanted disadvantages associated with the prior art compound.

SUMMARY OF THE INVENTION

Accordingly, it is an immediate object of this invention to provide a novel pharmaceutical compound and its acid addition salts that are useful for treating bronchial asthma and as a sympathomimetic agent.

Another object of the invention is to provide a novel and useful ester of 3-hydroxy-α-[(methylamino)methyl]benzyl alcohol and its accpeptable salts that are essentially free from the unwanted effects associated with the prior art.

Still another object of the invention is to provide a new and useful 3-pivaloxy-α-[(methylamino)methyl]-benzyl alcohol that possesses increased stability and solubility and can be administered in conventional pharmaceutical formulations.

Yet still another object of the invention is to provide the compound 3-pivaloxy-α-[(methylamino)methyl]-benzyl alcohol as a useful therapeutic agent that has improved lipoid solubility for enhanced resorption when administered to warm-blooded animal tissues.

Another object of the invention is to provide 3-pivaloxy-α-[(methylamino)methyl]benzyl alcohol that can be administered per se or can be disposed in aerosols and other types of pharmaceutical formulations to warm-blooded animals to produce a local or systemic physiological or pharmacological beneficial effect.

Other objects, features, and advantages of the invention will be apparent to those skilled in the art from the detailed description of the invention which follows, taken in conjunction with the accompanying claims.

DETAILED DESCRIPTION OF THE INVENTION

In attaining the objects, features, and advantages of the present invention, it has now been found that the compound embraced by Formula 1

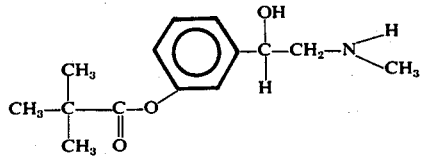

(Formula 1)

and its pharmaceutically acceptable salts possess heretofore unknown advantageous properties and are extremely valuable in the management of bronchial asthma, and for use as a general sympathomimetic agent that acts on postganglionic adrenergic nerve endings and structures innervated by them and further characterized by an enhanced rate of absorption while simultaneously overcoming the problems associated with prior art phenylephrine compounds.

The novel 3-pivaloxy-α-[(methylamino)methyl]benzyl alcohol of this invention, which can also be conveniently named 1-(3-pivaloxyphenyl)-2-(methylamino)ethanol or 3-pivaloxy-1-[1-hydroxy-2-(methylamine)ethyl] benzene is prepared by first contacting and reacting the hydroxy group of 3-hydroxyacetophenone (formula 2) with an acylating agent in an organic medium. Examples of acylating agents suitable for esterifying the hydroxyl group include anhydrides, mixed anhydrides, the chloride of the appropriate alkanoic acid, and the like. The acylation is carried out by contacting and reacting the hydroxyl group with, for example, an acid chloride, pivaloyl chloride (formula 3), in the presence of a solvent, at a temperature of −5°C. to 100°C., usually at refluxing temperature, and a pressure of 1 atmosphere or higher, for about 2 hours to 24 hours or longer. Generally, the reactants are in equivalent amounts, or in excess thereof, 1 to 10 moles of acid chloride to 1 mole of the hydroxyl reactant. The acylated product (formula 4) is recovered by conventional aqueous washing followed by evaporation of the organic solvent. The product can be purified by, for example, vacuum distillation or other conventional means.

Next, the esterified compound (formula 4) is halogenated, usually brominated, in the position α- to the keto- functionality by contacting and reacting 3-pivaloxyacetophenone (formula 4) with a halogenating agent in an organic medium. Examples of suitable halogenating agents include cupric bromide, bromine, and the like. The halogenation is carried out by reacting the halogenating agent, for example, bromine in carbon disulfide at a temperature of −5°C. or higher, usually at 5°C., and at a pressure of 1 atmosphere or higher, for about 1 hour to 24 hours or longer. Generally, the reactants are in equivalent amounts 1 mole bromine to 1 mole of the keto functionality. The brominated product (formula 5) is recovered by evaporation of the organic solvent and purified by conventional recrystallization.

Next, the reactive halogen moiety present in the α-halo-3-pivaloxyacetophenone is contacted with stoichiometric amounts, but usually with an excess, for example, 1 to 10 or more molecular equivalents of an amine, benzylmethylamine (formula 6) for example, for each reactive halogen moiety present as a reactant. The reaction is carried out in the presence of a suitable solvent, at a temperature of about 10°C. to about 75°C., usually at ambient temperature of about 25°C., and at atmospheric pressure, or higher pressures of from 1 to 10 atomspheres and the like. The product (formula 7) is recovered by conventional means such as, precipitation of the amine, as, for example, the hydrochloride salt from a solvent in which it is not soluble.

Next, the side chain keto functionality is reduced to the corresponding alcohol, and the benzyl functionality removed by catalytic hydrogenation of the α-benzylmethylamino-3-pivaloxyacetophenone (formula 7). Generally the hydrogenation is carried out in a suitable solvent in the presence of a noble metal catalyst such as platinum, palladium, rhodium, platinum oxide and the like. The hydrogenation is also carried out in a hydrogen environment, usually 2 atmospheres to 180 atmospheres and the like, at room temperature or higher, and in a standard Parr vessel or the like. The product (formula 8) is recovered, usually as an amine salt, by conventional means such as filtration, evaporation of the solvent, recrystallization, and the like.

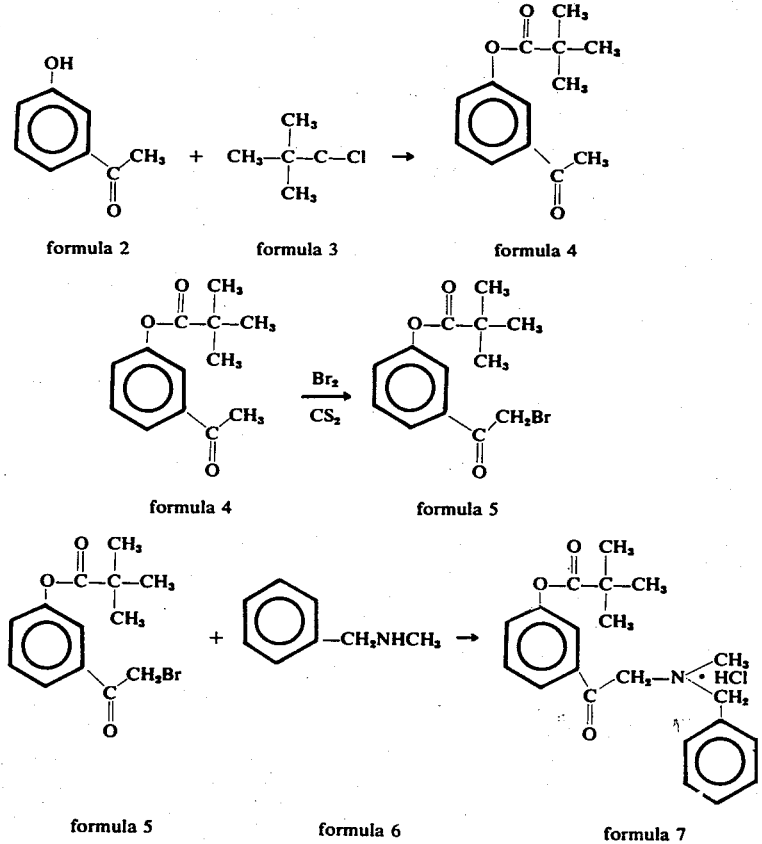

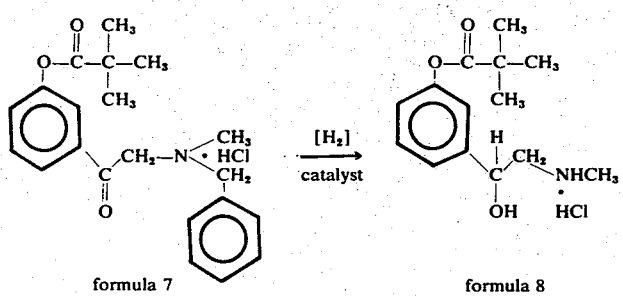

formula 7 → [H₂] catalyst → formula 8

The phrases, "pharmaceutically acceptable" and "non-toxic, acid addition salts" as used herein generally includes the non-toxic acid addition salts of the compounds of Formula 1, formed with non-toxic inorganic salts or organic acids. For example, the salts include those derived from inorganic acids such as hydrochloric, hydrobromic, sulfuric, sulfamic, phosphoric, nitric and the like; and the salts prepared from organic acids such as acetic, propionic, succinic, glycollic, stearic, lactic, malic, tartaric, citric, ascorbic, pamoic, maleic, hydroxymaleic, phenylacetic, glutamic, benzoic, salicylic, sulfanilic, fumaric, toluenesulfonic, and the like.

The pharmaceutically acceptable acid addition salts of the present invention can be synthesized from the compound embraced by Formula 1 by conventional, chemical methods. Generally, the salts are prepared by reacting the free base with stoichiometric amounts or with an excess thereof of the desired salt-forming inorganic or organic acid in a suitable solvent or various combination of solvents. For example, the free base can be dissolved in a mixed aqueous solution of the appropriate acid and the salt recovered by standard techniques, for example, by evaporation of the solution. Altlernatively, the free base can be charged into an organic solvent such as a lower alkanol, a symmetrical or unsymmetrical ether containing 2 to 10 carbon atoms, an alkyl ester, or mixtures thereof, and the like, and then it is treated with the appropriate acid to form the corresponding salt. The salt is recovered by standard recovery techniques, for example, by filtration of the desired salt on spontaneous separation from the solution, or it can be precipitated by the addition of a solvent in which the salt is insoluble and recovered therefrom.

Examples of suitable inorganic and organic solvents for performing the various reactions include any inorganic or organic solvent that does not adversely affect the reactants or the resulting product including halogenated solvents such as methylene chloride, chloroform, carbon tetrachloride, ethylene chloride, ether solvents such as diethyl ether, dimethyl ether, and other solvents such as tetrahydrofuran, dioxane, diglyme, n-hexane, cyclooctane, benzene, heptane, cyclohexane, and the like.

The following example is set forth as a representative method illustrative of the spirit of the present invention. This example is not to be construed as limiting the scope of the invention as other functionally equivalent means will be readily apparent to those skilled in the subject art in the light of the present specification and the accompanying claims.

EXAMPLE 1

Synthesis of 3-pivalixy-α-[(methylamino)methyl]-benzyl alcohol. First, 0.147 moles of 3-hydroxyacetophenone (formula 2) is dissolved in 100 ml benzene and 10 ml pyridine. Next, 0.40 moles of pivaloyl chloride (formula 3) is added at such a rate that the reaction is controllable. The mixture is then refluxed overnight, cooled and washed with two 100-ml portions of 1 N. HCl. The organic layer is then evaporated under reduced pressure and the residue vacuum distilled. The product (formula 4) distills at 120°C. at 0.6 mm Hg.

Next, 0.032 moles of 3-pivaloxyacetophenone is dissolved in 50 ml carbon disulfide and the solution chilled in an ice bath with stirring. A solution of 0.032 moles bromine in 20 ml. carbon disulfide is then dropped into the solution of 3-pivaloxyacetophenone and the temperature maintained at 5°C. or lower. Stirring is continued 1 hour during which the reddish bromine color dissipates and moderate evolution of hydrogen bromide is observed. Evaporation of the solvent results in the product (formula 5) which is recrystallized from benzene.

Next, 0.033 moles of α-bromo-3-pivaloxyacetophenone is dissolved in 100 ml. acetone and the solution degassed with nitrogen. Then, 0.067 moles of benzylmethylamine (formula 6) is added and the mixture stirred under a nitrogen blanket for about 3 hours. The product (formula 7) is isolated as the hydrochloride salt by filtration of the reaction mixture and passing dry hydrogen chloride gas into the filtrate and recovery by filtration of the resulting precipitates. The material (formula 7) can be purified further by recrystallization from ethanol and ether.

Finally, 0.037 moles of α-benzylmethylamine-3-pivaloxyacetophenone hydrochloride is dissolved in 100 ml. of 95 percent ethanol and 0.5 g. 10 percent palladium or charcoal is added. The mixture is shaken in a Parr vessel for 3–4 hours under 50 psi hydrogen pressure. The product (formula 8) is recovered by filtration of the reaction mixture, evaporation of the filtrate, and recrystallization from acetone.

The novel compound and its pharmaceutically acceptable salts can be used by the pharmaceutical and the veterinary arts for ophthalmological treatment and for treating bronchial asthma, hay fever and allergic rhinitis in a variety of pharmaceutical preparations. The new compound and its non-toxic salts are thus administrable in the form of injectables, tablets, capsules, solutions, suppositories, ointments, emulsions, jellies, buccal patches, oral inhalants, nasal inhalants, aerosols, and in other suitable forms. The pharmaceutical or veterinary preparation which contains from about 0.1 microgram to 10 grams of the compound is conveniently admixed with a non-toxic pharmaceutical organic or inorganic carrier. Typical of pharmaceutically acceptable carries are, for example, water, mixtures of water and water-miscible solvents such as lower alkanols or aralkanols, vegetable oils, polyakylene glycols, petroleum based jelly, ethyl cellulose, ethyl oleate, carboxymethylcellulose, polyvinylpyrrolidone, isopropyl myristate and other conventionally employed acceptable carriers. The pharmaceutical preparation may also contain non-toxic auxiliary substances such as disintegrates, binders, emulsifiers, preservatives, wetting agents, bodying agents and the like, as for example, polyethylene glycols 200, 300, 400 and 600, carboxwaxes 1,000, 1,500, 4,000 and 10,000 bacetrial components such as quaternary ammonium compounds, phenylmercuric salts known to have cold sterilizing properties and which are non-injurious in use, thimerosal, propyl paraben, buffering ingredients such as sodium chloride, sodium borate, sodium acetate, gluconate buffers, and other conventional ingredients such as sorbitan monolaurate, triethanolamine oleate, polyoxyethylene sorbitan monopalmitylate, dioctyl sodium sulfosuccinate, monothioglycerol, thisorbitol, ethylenediamine tetracetic acid, and the like. Additionally, suitable vehicles can be used as carrier media for the present purpose including conventional phosphate buffer vehicle systems, isotonic boric acid vehicles, isotonic sodium chloride vehicles, isotonic sodium borate vehicles, and the like.

Exemplary of a typical method for preparing a solution to be used with conventional nebulizers containing 3-pivaloxy-α-[(methylamino)methyl]-benzyl alcohol salt, sodium chloride, chlorobutanol, oxime sulfate and distilled water is as follows:

| Ingredients | Per Liter, gm. |
| --- | --- |
| 3-pivaloxy-α-[(methylamino) methyl]benzyl alcohol hydrochloride | 2.0 |
| Sodium chloride | 8.0 |
| Chlorobutanol | 5.0 |
| Oxime sulfate | 0.1 |
| Distilled water | qs. 1 liter |

A second pharmaceutical formulation similar to the formulation prepared immediately above is made by following that procedure except that the amount of 3-pivaloxy-α-[(methylamino)methyl]benzyl alcohol hydrochloride is increased to 10 grams and 2 percent phenylethyl alcohol is used as the preservative.

A novel lyophilized pharmaceutical preparation for subsequent reconstitution immediately before therapeutic administration is prepared as follows: first, 4 grams of 3-pivaloxy-α-[(methylamino)methyl]benzyl alcohol hydrochloride and 8 grams of mannitol U.S.P. are mixed with agitation into 1 liter of distilled water and the solution formed filtered through a sterile filter. Then, 5 cc to 12 cc of the solution is transferred to amber vials and lyophilized by conventional methods until the freshly forming cake is dry. The lyophilized, dry cake is reconstituted with 10 cc of a diluent containing the following: 2 grams sodium chloride, 5 grams of chlorobutanol, 0.1 gram of oxime sulfate, mixed with distilled water to the volume line in a 1000 milliliter volumetric flask.

The lyophilized cake can optionally be prepared by replacing the mannitol with buffering agents such as a mixture of sodium chloride and sodium dihydrogen phosphate, or a mixture of potassium chloride and either potassium acetate or sodium acetate.

Oral dosage forms such as tablets and capsules can be prepared by conventional means and are readily apparent to those skilled in the art.

Exemplary of formulations suitable for inhalation therapy include those formulations that can be administered from nebulizers of the squeeze-bulb, reservoir, Venturi effect assembly, pressurized dispensers using chlorofluorohydrocarbon propellants, pre-micronized powders in liquid propellants, liquid-vapor phase aerosols, and the like. Typically, the formulation suitable for a conventional nebulizer optionally is comprised of 0.4 to 0.8 percent solution of 3-pivaloxy-α-[(methylamino)methyl]benzyl alcohol hydrochloride in a buffered carrier comprised of sodium chloride, sodium citrate, glycerine and a trace of preservative. In one embodiment the air in the dispenser can be displaced with nitrogen gas. A typical pressurized dispenser can optionally be 0.02 to 0.50 percent on a weight by weight basis of 3-pivaloxy-α[(methylamino)-methyl]benzyl alcohol in a mixture of dichlorodifluoromethane and dichlorotetrafluoroethane with a sodium lactate-lactic acid buffer, about 30 to 40 percent weight by weight of an alkanol and aromatic flavoring agent. Other formulations containing the compound of the invention suspended in fluorochlorocarbons containing sorbitan trioleate and the like can also be used for administering the compound.

The dose administered, whether a single dose or a daily dose, will, of course, vary because of the chosen route of administration, and the size of the recipient. The dosage administered is not subject to definite bounds, but it will usually be an effective amount, or the equivalent on a molar basis of the pharmacologically active form produced upon the metabolic release of the active drug to achieve its desired pharmacological and physiological effect. The medical dose for warm-blooded mammals, including humans and primates by the intramuscular or subcutaneous route will be about 100 micrograms to 5 milligrams administered in 0.1 to 1.5 ml. of a 0.1 to 0.5 percent oil suspension, with the usual intramuscular dose of 200 to 750 micrograms in 0.2 to 0.75 ml. of a 0.1 to 0.5 percent solution. For oral inhalation the dose is about 0.01 to 2.0 percent applied as a fine mist. For typical application in operative procedures on the nose and throat, solutions of 0.002 to 0.97 percent may be used. For typical oral administration, 5 mgm to 250 mgm may be used in tablets or capsules. Generally, the dosage form for a typical non-toxic salt, for example, the hydrochloride in a solution intended for inhalation will be about 0.025 to 4 percent and the like. The dose for farm animals is generally about 4 to 10 ml. by the subcutaneous or intramuscular route for horses and cattle and for dogs about 0.2 to 0.6 ml., and the like.

The unexpected, pronounced pharmacological properties for the compound of the invention and its nontoxic salts are demonstrated by using standard art known testing procedures. For example, the mydriatic effect of the compound is observed in a group of rabbits by administering the active compound to their eyes and observing the effects 20 minutes later. The test is carried out by applying a 0.025 percent weight by volume isotonic saline solution of 3-pivaloxy-α-[(methylamino)methyl]benzyl alcohol hydrochloride or the 2.5 percent commercial product to New Zealand white rabbits and the eyes of the animals observed using the eyes of similar rabbits treated with isotonic saline as a control. The observed results indicated no mydriasis for the control and complete mydriasis for both the 2.5 percent commercial product and for the 0.025 percent solution of the compound of the invention.

The oral effectiveness of the compound of the invention was compared to that of the prior art compound by administering 40 mgm/kgm of the prior art compound and 20 mgm/kgm of the compound of the invention to adult male rats and observing the mydriatic effect produced. A more pronounced mydriatic effect was observed for the compound of the invention.

The enhanced stability of the compound is demonstrated by the rate of auto-oxidation of a 2.5 percent solution of the compound of the invention in isotonic saline and a 2.5 percent solution of the prior art compound in isotonic saline in an air oxidative environment. The results are set forth in Table I as the time for color formation, pink to brown, to develop from the first exposure of the solution to the environment.

TABLE I

| Compound | Time for Color Formation |
|---|---|
| 3-pivaloxy-α-[(methylamino)methyl]benzyl alcohol | 7 days |
| 3-hydroxy-α-[(methylamino)methyl]benzyl alcohol | 2 hours |

The enhanced stability of the compound is ascertained and compared against other compounds by measuring its rate of hydrolysis in a buffer at pH 4.5 at the physiological temperature of 37°C. and expressed as $t_{1/2}$ in days. The test solutions had a concentration of 0.5 mgm per milliliter and the rate of hydrolysis was measured in a spectrophotometer. The results are set forth in Table II.

TABLE II

| Compound | $t_{1/2}$ days |
|---|---|
| 3-acetoxy-α-[(methylamino)methyl]benzyl alcohol | 10 days |
| 3-pivaloxy-α-[(methylamino)methyl]benzyl alcohol | 300 days |

The above examples and disclosures are set forth merely for illustrating the mode and the manner of the invention, and, while various modifications and embodiments can be made by those skilled in the art, in the light of this invention, they are made without departing from the spirit of the invention. It is intended, therefore, that the invention be limited only by the scope of the claims which follow.

What is claimed is:

1. A sympathomimetic composition comprising a sympathomimetically effective amount of a member selected from the group consisting of 3-pivaloxy-α-[(methylamino)methyl]benzyl alcohol and its non-toxic pharmaceutically acceptable acid addition salt, admixed with a non-toxic organic or inorganic pharmaceutically acceptable carrier.

2. The composition according to claim 1, wherein the therapeutically effective amount consists of from 0.1 microgram to 10.0 grams of 3-pivaloxy-α-[(methylamino)methyl]benzyl alcohol, admixed with a non-Toxic organic or inorganic pharmaceutically acceptable carrier.

3. The composition according to claim 1, wherein the composition consists of 0.01 percent to 10.0 percent of 3-pivaloxy-α-[(methylamino)methyl]benzyl alcohol and the carrier is a non-toxic pharmaceutically acceptable ophthalmic carrier.

4. The composition according to claim 1, wherein the composition consists of 0.01 percent to 2.0 percent of 3-pivaloxy-α[(methylamino)methyl]benzyl alcohol and the carrier is a nontoxic pharmaceutically acceptable inhalation carrier.

5. The composition according to claim 1, wherein the composition consists of 0.002 percent to 0.97 percent of 3-pivaloxy-α-[(methylamino)methyl]benzyl alcohol and the carrier is a nontoxic pharmaceutically acceptable intranasal carrier.

6. The composition according to claim 1, wherein the composition consists of 5 mgm to 250 mgm of 3-pivaloxy-α-[(methylamino)methyl]benzyl alcohol and the carrier is a nontoxic pharmaceutically acceptable oral solid or liquid carrier.

7. A method for inducing a sympathomimetic responce in a warm-blooded animal in need thereof which comprises administering to said animal, a sympathomimetically effective amount of a composition comprising a member selected from the group consisting of 3-pivaloxy-α-[(methylamino)methyl]benzyl alcohol and a non-toxic acid addition salt thereof, and a non-toxic organic or inorganic pharmaceutically acceptable carrier.

8. The method of claim 7, wherein said sympathomimetically effective amount is between 0.01 percent and 10.0 percent.

9. The method of claim 7, wherein said sympathomimetically effective amount is between 0.1 microgram and 10.0 grams.

10. The method of claim 7, wherein said non-toxic organic or inorganic pharmaceutically acceptable carrier is an oral carrier.

11. The method of claim 7, wherein said non-toxic organic or inorganic pharmaceutically acceptable carrier is an ophthalmic carrier.

12. The method of claim 7, wherein said sympathomimetic response is mydriasis.

13. The method of claim 7, wherein said sympathomimetic response is a lowering of intraocular pressure.

* * * * *